(12) United States Patent
Ho et al.

(10) Patent No.: US 6,678,234 B2
(45) Date of Patent: Jan. 13, 2004

(54) METHOD FOR REDUCING VIBRATION OF MOTOR HAVING CARRIER INTERFACE

(75) Inventors: Chung-Lung Ho, Taichung (TW); Yung-Ping Lin, Taoyuan (TW); Po-Zen Shih, Tainan (TW)

(73) Assignee: Delta Electronics Inc. (TW)

( * ) Notice: Subject to any disclaimer, the term of this patent is extended or adjusted under 35 U.S.C. 154(b) by 125 days.

(21) Appl. No.: 09/986,162

(22) Filed: Nov. 7, 2001

(65) Prior Publication Data

US 2002/0075788 A1 Jun. 20, 2002

(30) Foreign Application Priority Data

Dec. 20, 2000 (TW) ........................................ 89127311 A

(51) Int. Cl.[7] .............................................. G11B 25/04
(52) U.S. Cl. ...................................................... 369/271
(58) Field of Search ................................ 369/258, 263, 369/264, 270, 271; 360/99.12; 451/41, 63, 285, 287, 288, 290

(56) References Cited

U.S. PATENT DOCUMENTS

| 4,358,843 | A | * | 11/1982 | Rager ........................ 369/261 |
| 4,754,447 | A | * | 6/1988 | VanSant ..................... 369/270 |
| 5,674,115 | A | * | 10/1997 | Yamashita et al. .......... 451/289 |
| 6,116,987 | A | * | 9/2000 | Kubo ........................... 451/41 |
| 6,195,234 | B1 | * | 2/2001 | Sundaram et al. .......... 360/135 |
| 6,196,904 | B1 | * | 3/2001 | Matsuo et al. .............. 451/288 |
| 6,312,320 | B2 | * | 11/2001 | Sato et al. ................... 451/285 |

FOREIGN PATENT DOCUMENTS

JP   8-180644   *   7/1996

* cited by examiner

Primary Examiner—David L. Ometz
(74) Attorney, Agent, or Firm—Birch, Stewart, Kolasch & Birch, LLP

(57) ABSTRACT

A method for reducing vibration of a motor having a carrier interface. First, a rotor having a carrier interface and a shaft is provided. A rough sheet is mounted to the carrier interface to fix the object disposed thereon. Then, the rough sheet is polished by a polisher along a direction perpendicular to axis of the shaft. Finally, the rotor is combined with a stator so as to form a motor.

6 Claims, 4 Drawing Sheets

METHOD FOR REDUCING VIBRATION OF MOTOR HAVING CARRIER INTERFACE

BACKGROUND OF THE INVENTION

1. Field of the Invention

The present invention relates to a method for improving the performance of a motor, and more particularly to a method for reducing the vibration of a motor having a carrier interface.

2. Description of the Prior Art

Generally, the motor having a carrier interface is used in the applications of a CD player, a DVD-ROM or a hard disk. As shown in FIG. 1(a) and FIG. 1(b), a conventional motor typically includes a motor 10 and a carrier interface 20. Among these, the carrier interface 20 is used to load a storage medium such as a CD (not shown). Besides, as shown in FIG. 1(b), the carrier interface 20 is connected to the stator of a motor 10 via a shaft 30. A head such as an optical head can access the data recorded in the storage medium rotated by the motor 10 and the shaft 30. The carrier interface 20 further includes a rough sheet 50 formed thereon, as indicated by the oblique line of FIG. 1(a). The rough sheet 50 further includes a rough surface to enhance a frictional force such that the storage medium positioned thereon can be fixed properly.

However, in the prior art, the verticality of the carrier interface 20 or the rough sheet 50 relative to the shaft 30, or the flatness of the rough sheet 50 is not satisfied. In this case, when the motor 10 is rotating, the relative distance from the storage medium to the head is not constant. As a result, the so-called vibration problem occurs and an access to the storage medium is thus affected. As the rotation speed of the motor is raised increasingly, the vibration problem is more serious.

In the prior art, the method for solving the vibration problem is shown in FIG. 1(c) and illustrated as follows. A motor having a carrier interface is positioned on the base 60 of an apparatus. A cap 70 is put on the carrier interface 20. Then, the carrier interface 20 is rotated. Meanwhile, a probe 80 is used to detect the height of the surface of the cap 70 such that the higher point and the lower point of the carrier interface 20 can be indirectly determined. Thereafter, based on the resulting topography of the carrier interface 20, the higher point of the cap 70 is pressed down so as to adjust the verticality of the carrier interface 20 relative to the shaft 30. The above-mentioned steps are repeated until the final topography is satisfied. However, the above-mentioned method is achieved manually. Besides, the carrier interface 20 still has the minimum height difference of at least 50 micrometer. Unfortunately, the pressing step in the above-mentioned method may damage the structure of the motor, and especially the shaft. If the undesirable vibration problem is not solved effectively, the high-level recording apparatus, such as DVD or high speed CD-ROM, maybe affected seriously, since they requires more accuracy in tolerance.

Accordingly, there has been a strongly felt need for providing a more effective solution for the vibration problem without damaging the structure of the shaft.

SUMMARY OF THE INVENTION

Therefore, the main object of the present invention is to provide a method for solving the aforementioned vibration problem.

It is a general object of the present invention to provide method for improving the performance of the motor.

First, a rotor assembly is provided. As known in the prior art, the rotor assembly includes a magnetic ring and a metal case. The rotor assembly further includes a shaft. One terminal of the shaft is coupled to a carrier interface, such as a turn table. The carrier interface further includes a rough sheet having a rough surface to enhance the frictional force such that object positioned thereon can be fixed properly.

Then, a polishing step is performed to polish the rough sheet. The carrier interface is rotated around the first rotation direction. For example, the stator is clamped and rotated by a suitable apparatus. Thereafter, the rough sheet is polished by a polisher, such as a grinder, rotating around the second rotation direction. Besides, during the polishing process, the polisher further moves along the direction perpendicular to the axis of the shaft. For example, the polisher moves from the outer periphery to the inner periphery of the rough sheet. As a result, the verticality between the surface of the rough sheet and the shaft can be increased significantly through the polishing step. The vibration problem is thus solved.

After the rough sheet is polished completely, the assembling step is performed. Via another terminal of the shaft, the rotor assembly is combined with a stator assembly so as to form a motor having a carrier interface. In this manner, the improved verticality between the carrier interface and the shaft is achieved. That is, the above-mentioned method provided by the present invention can prevent the vibration effectively.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
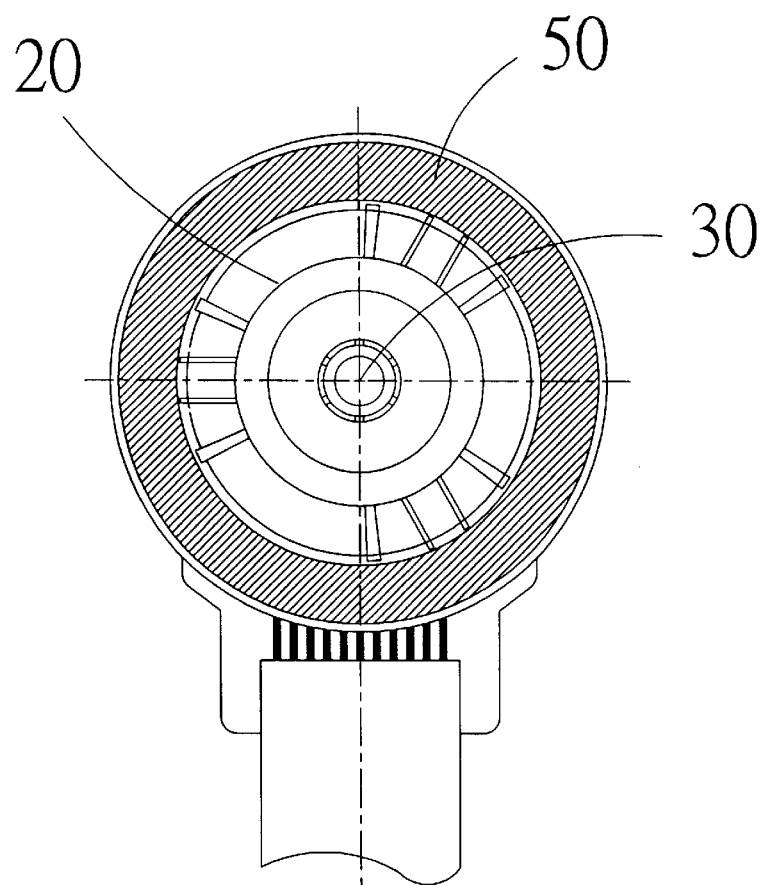
FIG. 1(a) is a top view illustrating a conventional carrier interface.
Figure 1B:
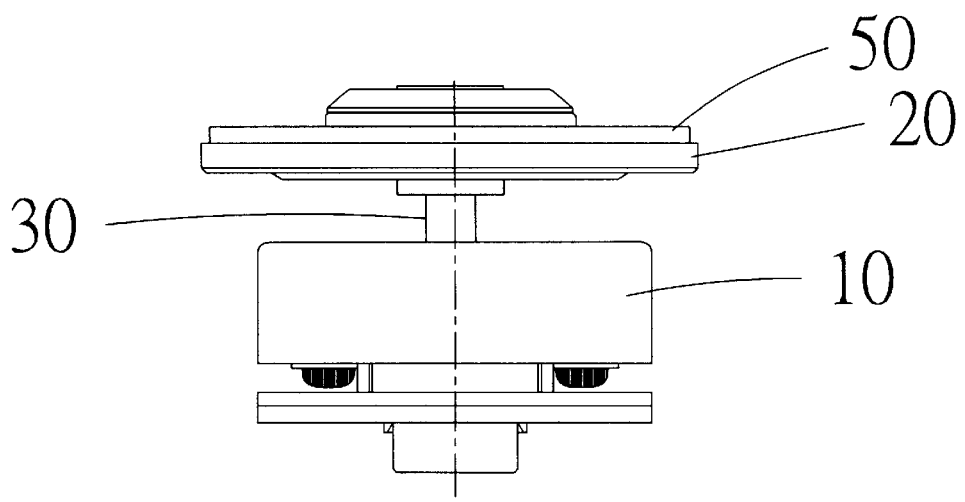
FIG. 1(b) is a side view illustrating a conventional motor having carrier interface.
Figure 1C:
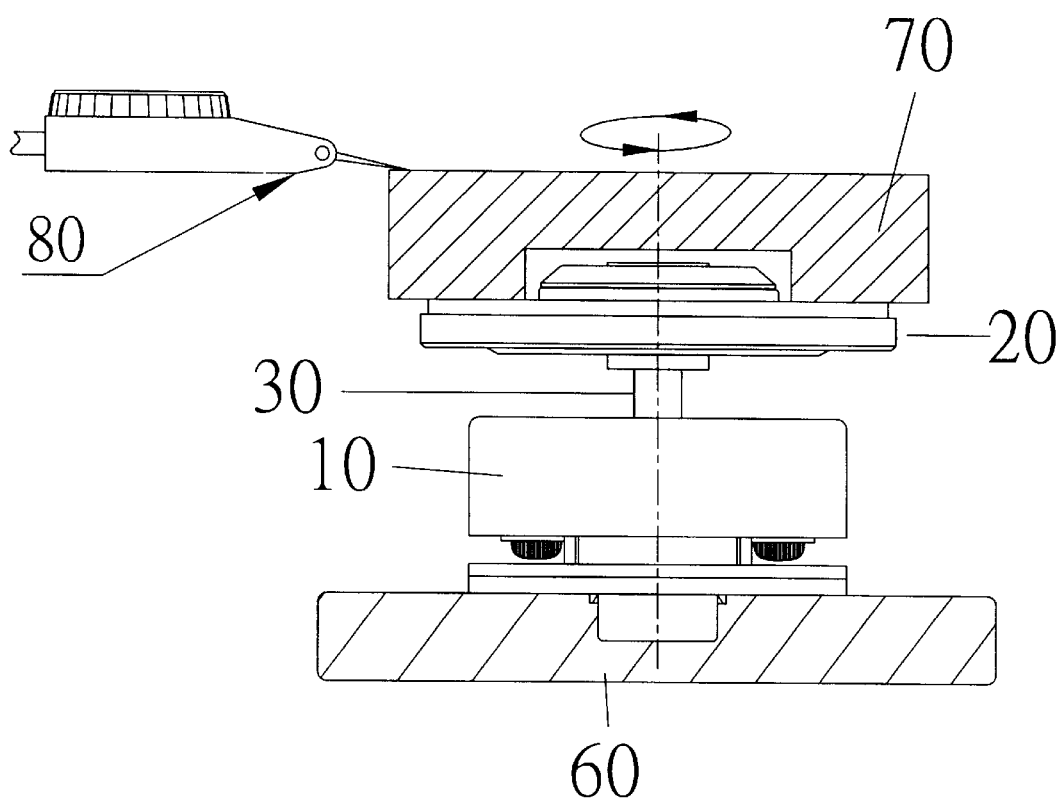
FIG. 1(c) is a schematic diagram illustrating the conventional method and apparatus for measuring and solving vibration.
Figure 2:
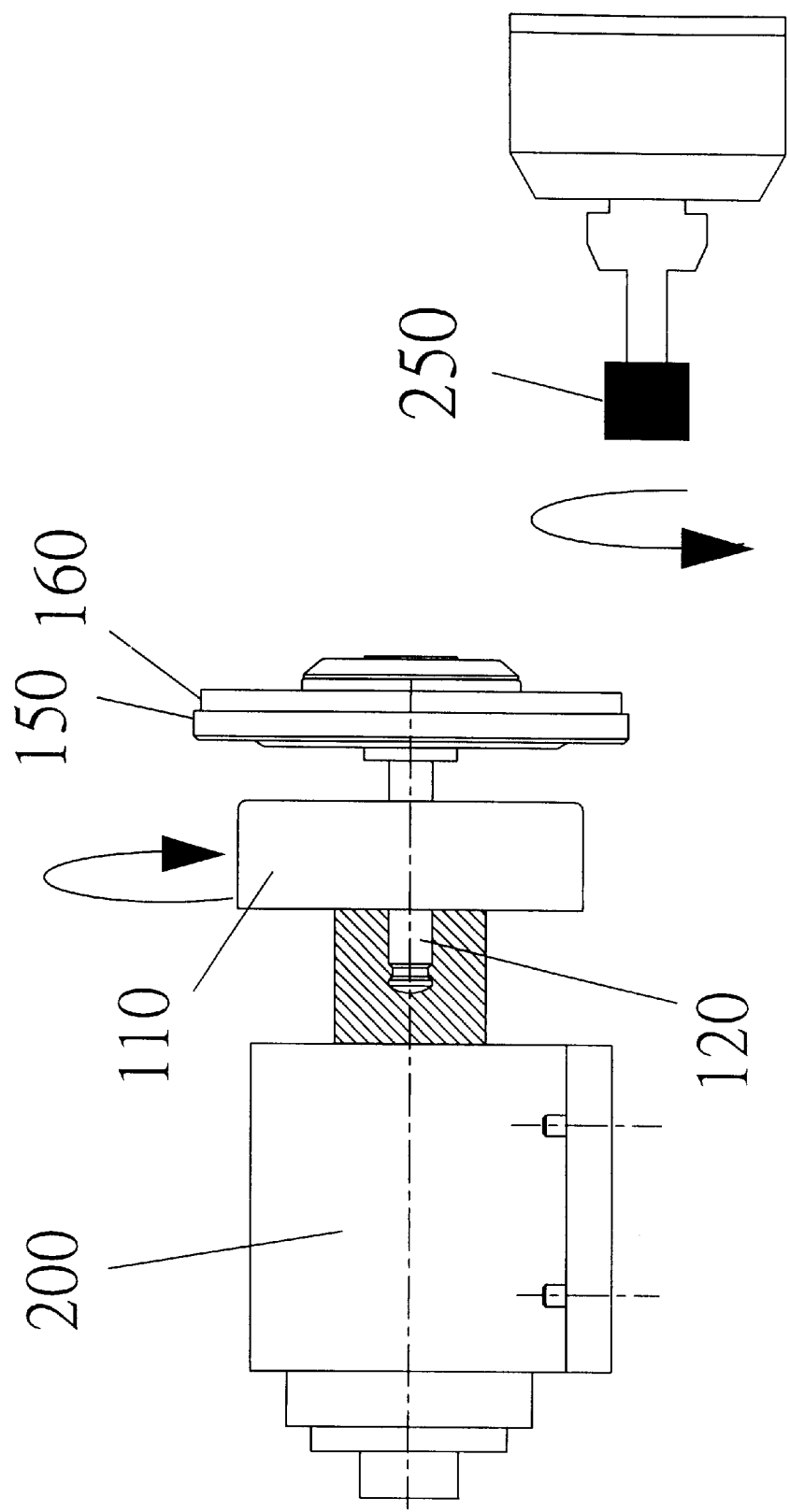
FIG. 2 is a schematic diagram illustrating the motor having carrier interface according to the present invention.
Figure 3:
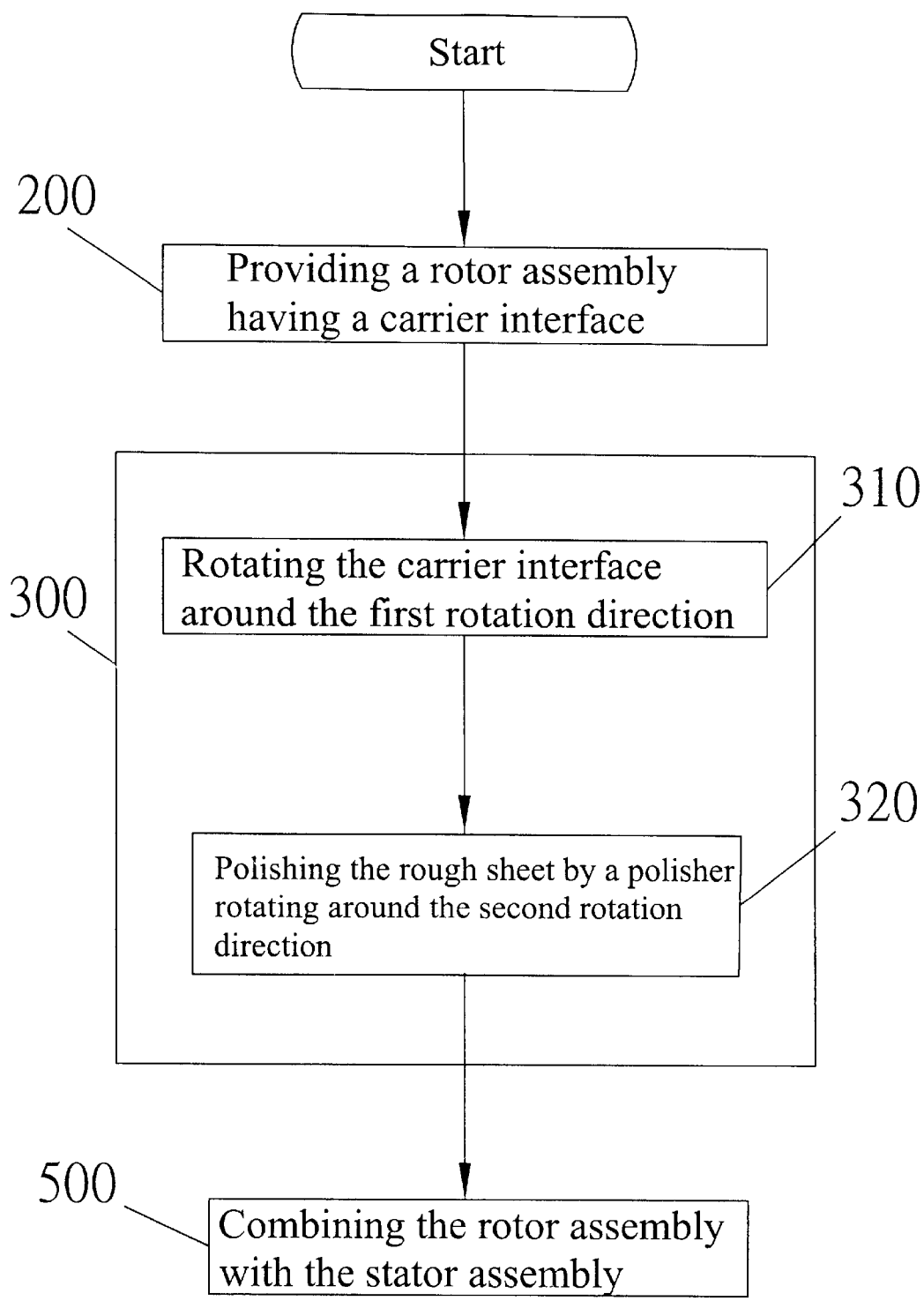
FIG. 3 is a flowchart illustrating the steps according to the present invention.

A method for reducing the vibration of a motor having a carrier interface is provided. Referring to FIG. 2 and FIG. 3, the method includes three steps as follows. First, as shown in FIG. 3, in the step 200, a rotor assembly 100 shown in FIG. 2 is provided. As known in the prior art, the rotor assembly 100 includes a magnetic ring and a metal case. The rotor assembly 110 further includes a shaft 120. One terminal of the shaft 120 is coupled to a carrier interface 150, such as a turn table. The carrier interface 150 further includes a rough sheet 160 having a rough surface to enhance the frictional force such that object, such as a storage medium, positioned thereon can be fixed properly. The rough sheet 160 is made of the material chosen from the group consisting of rubber, silicone epoxy, and other materials that have the effect of preventing the slip.

Still referring to FIG. 2 and FIG. 3, a polishing step 300 is performed to polish the rough sheet 160. The step 300 further includes the step 310 and the step 320. Among these, in the step 310, the carrier interface 150 is rotated around the first rotation direction. For example, the stator 110 is clamped by an apparatus 200 shown in FIG. 2 so as to rotate the carrier interface 150. Thereafter, the step 320 is performed. In the step 320, the rough sheet 160 is polished by a polisher 250, such as a grindstone, rotating around the second rotation direction. Besides, during the polishing process, the polisher 250 further moves along the direction perpendicular to the axis of the shaft 120. For example, the polisher 250 moves from the outer periphery to the inner periphery of the rough sheet 160. As a result, the verticality between the surface of the rough sheet 160 and the shaft 120 can be increased significantly through the polishing step 300. The vibration problem is thus solved.

Still referring to FIG. 2 and FIG. 3, after the rough sheet 160 is polished completely, the step 500 is performed. Via another terminal of the shaft 120, the rotor assembly 110 is combined with a stator assembly (not shown) so as to form a motor 100 having a carrier interface 150. In this manner, the improved verticality between the carrier interface 150 and the shaft 120 is achieved. That is, the above-mentioned method provided by the present invention can prevent the vibration effectively. It should be noted that the conventional motor has the height difference of at least 50 micrometer. In contrast to the conventional motor, the motor having a carrier interface according to the present invention has the height difference of less than 5 micrometer.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for reducing vibration of a motor having a carrier interface, comprising the steps as follows:
   providing a rotor having a carrier interface, said rotor including a shaft, said carrier interface including a rough sheet formed thereon;
   polishing said rough sheet along a direction perpendicular to the axis of the shaft; and
   combining said rotor with a stator so as to form a motor.

2. The method according to claim 1, further comprises the steps as follows:
   rotating said rotor around a first rotation direction; and
   polishing said rough sheet with a polisher rotating around a second rotation direction.

3. The method according to claim 1, wherein said rough sheet is chosen from the group consisting of rubber, silicone, epoxy and other materials that have the function of preventing slip.

4. A method for reducing vibration of a motor having a carrier interface, comprising the steps as follows:
   providing a rotor having a carrier interface, said rotor including a shaft, said carrier interface including a rough sheet formed thereon;
   rotating said rotor around a first rotation direction;
   polishing said rough sheet with a polisher rotating around a second rotation direction; and
   combining said rotor with a stator so as to form a motor.

5. The method according to claim 4, wherein said polisher moves along a direction perpendicular to the axis of the shaft.

6. The method according to claim 4, wherein said rough sheet is chosen from the group consisting of rubber, silicone, epoxy and other materials that have the function of preventing slip.

* * * * *